Figure 1:
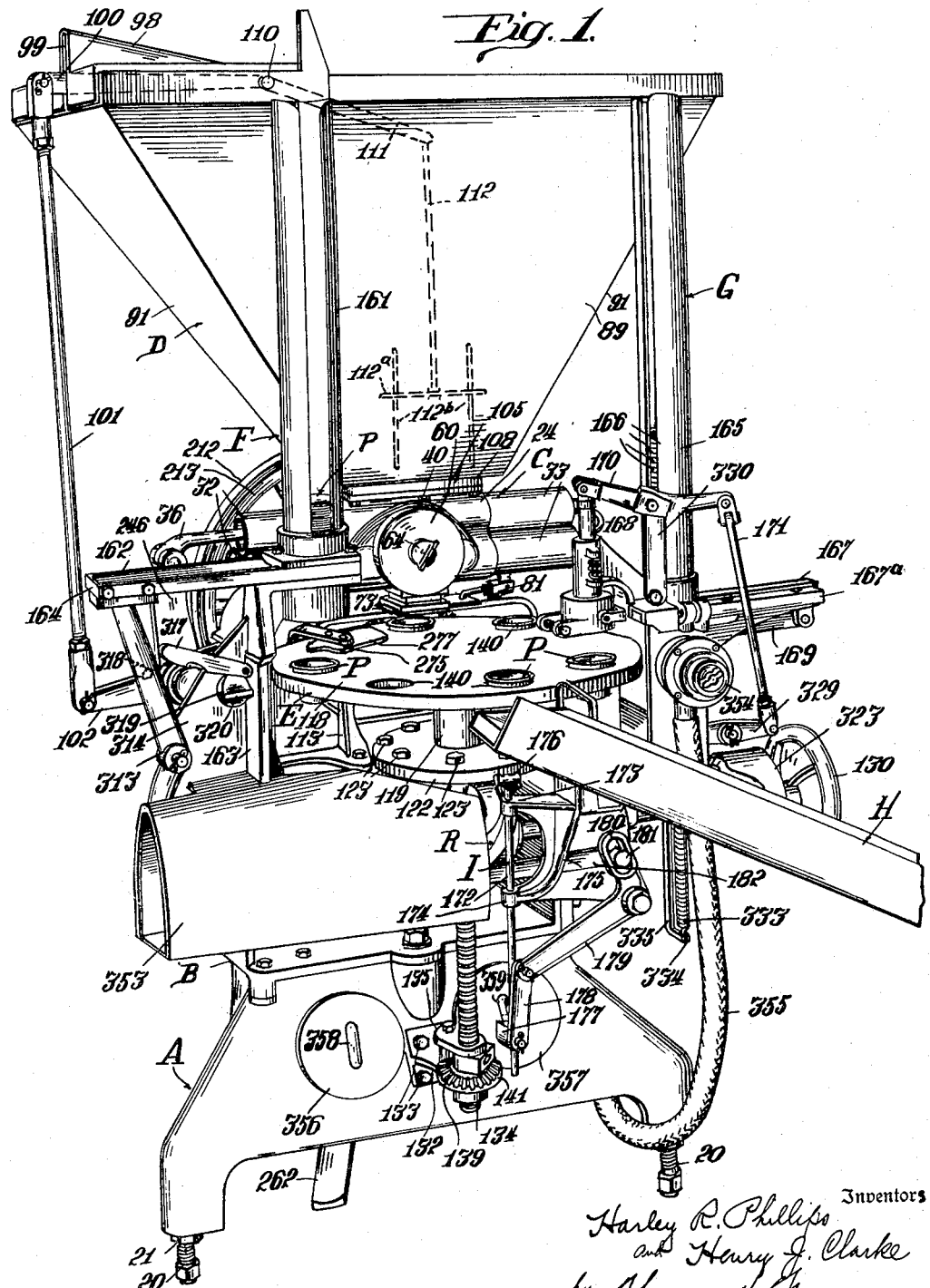

Aug. 4, 1936.　　H. R. PHILLIPS ET AL　　2,049,722
FILLING MACHINE
Original Filed June 18, 1934　　9 Sheets-Sheet 1

Inventors
Harley R. Phillips
and Henry J. Clarke
by Thomas H. Ferguson
Attorney

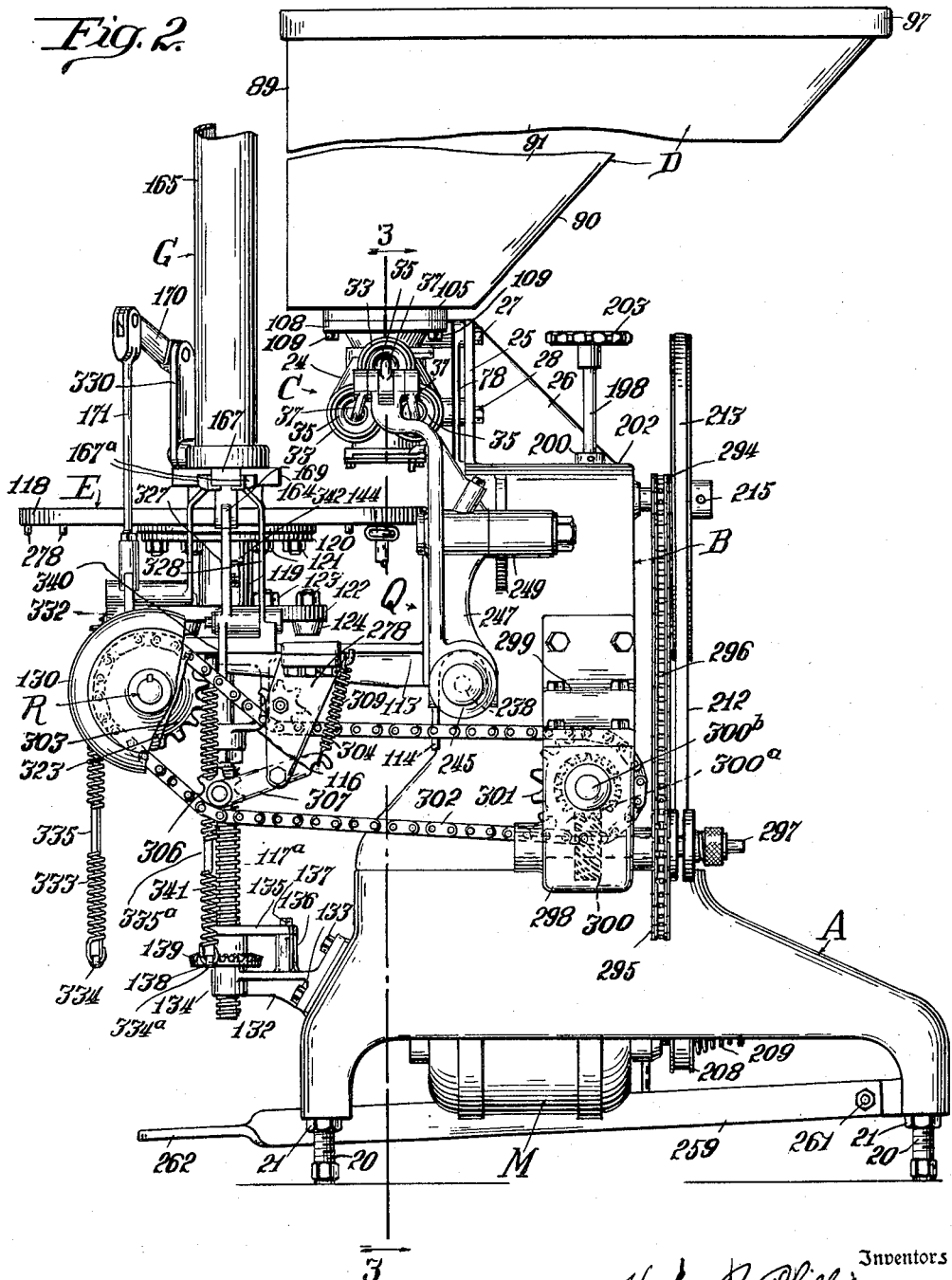

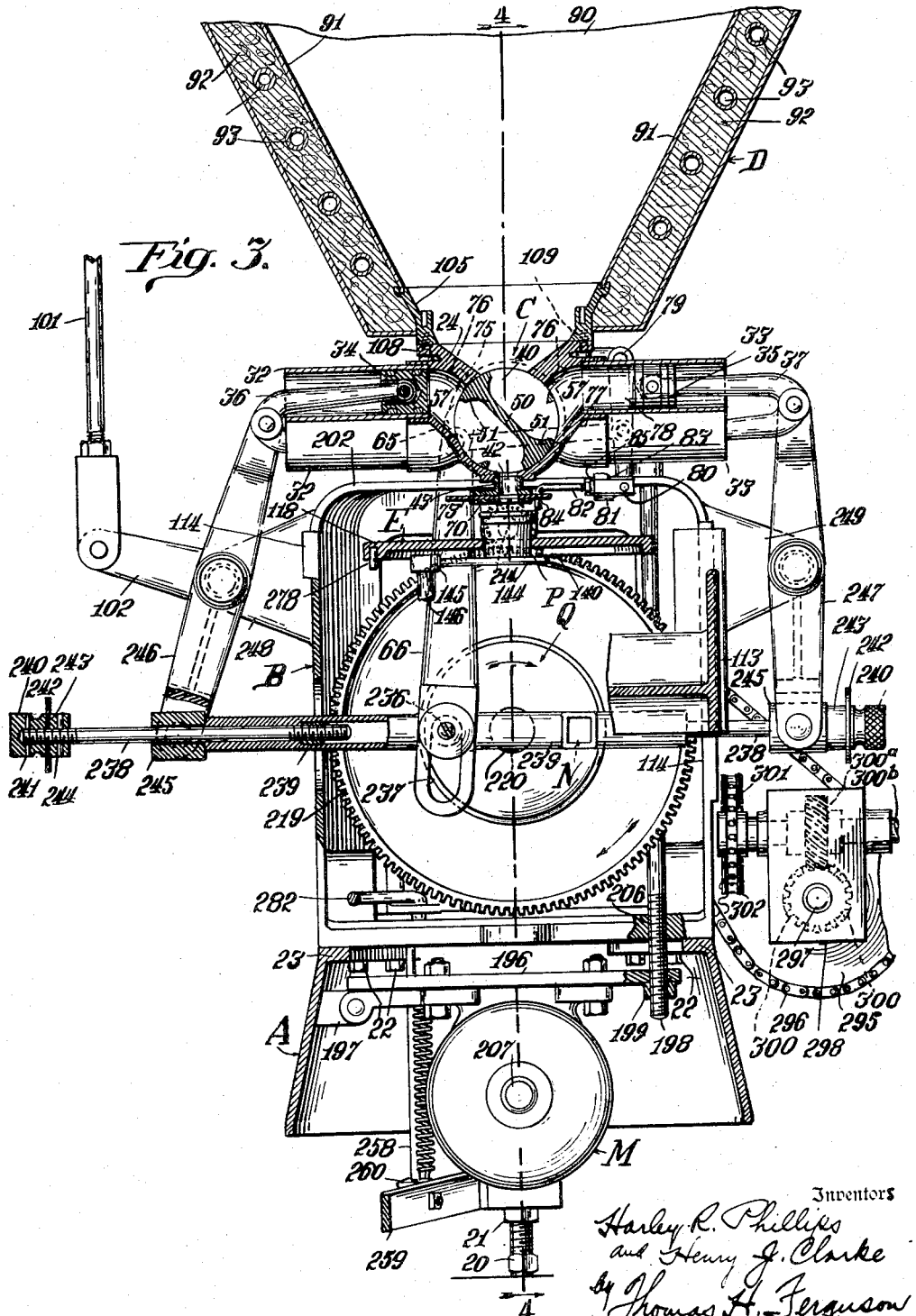

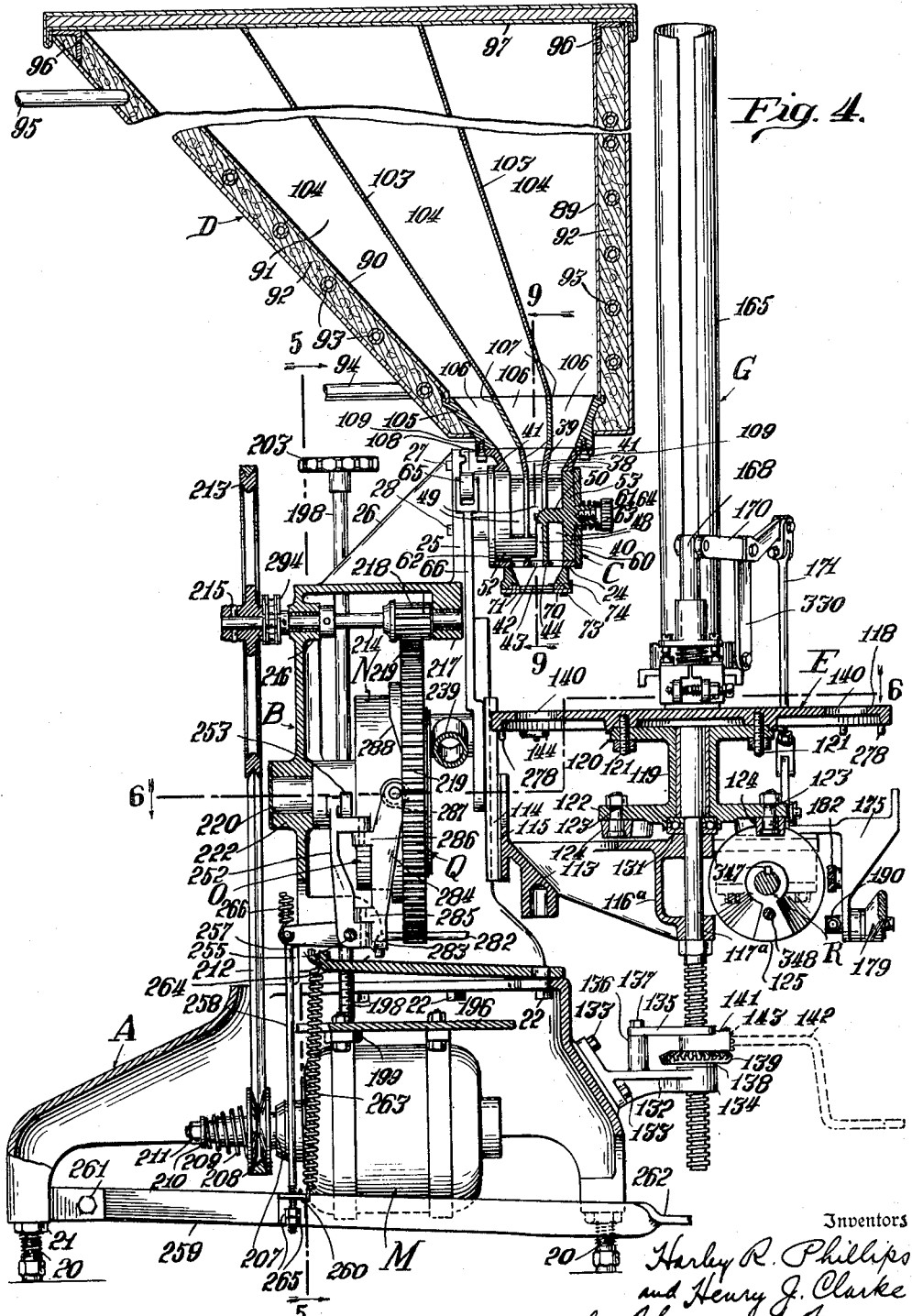

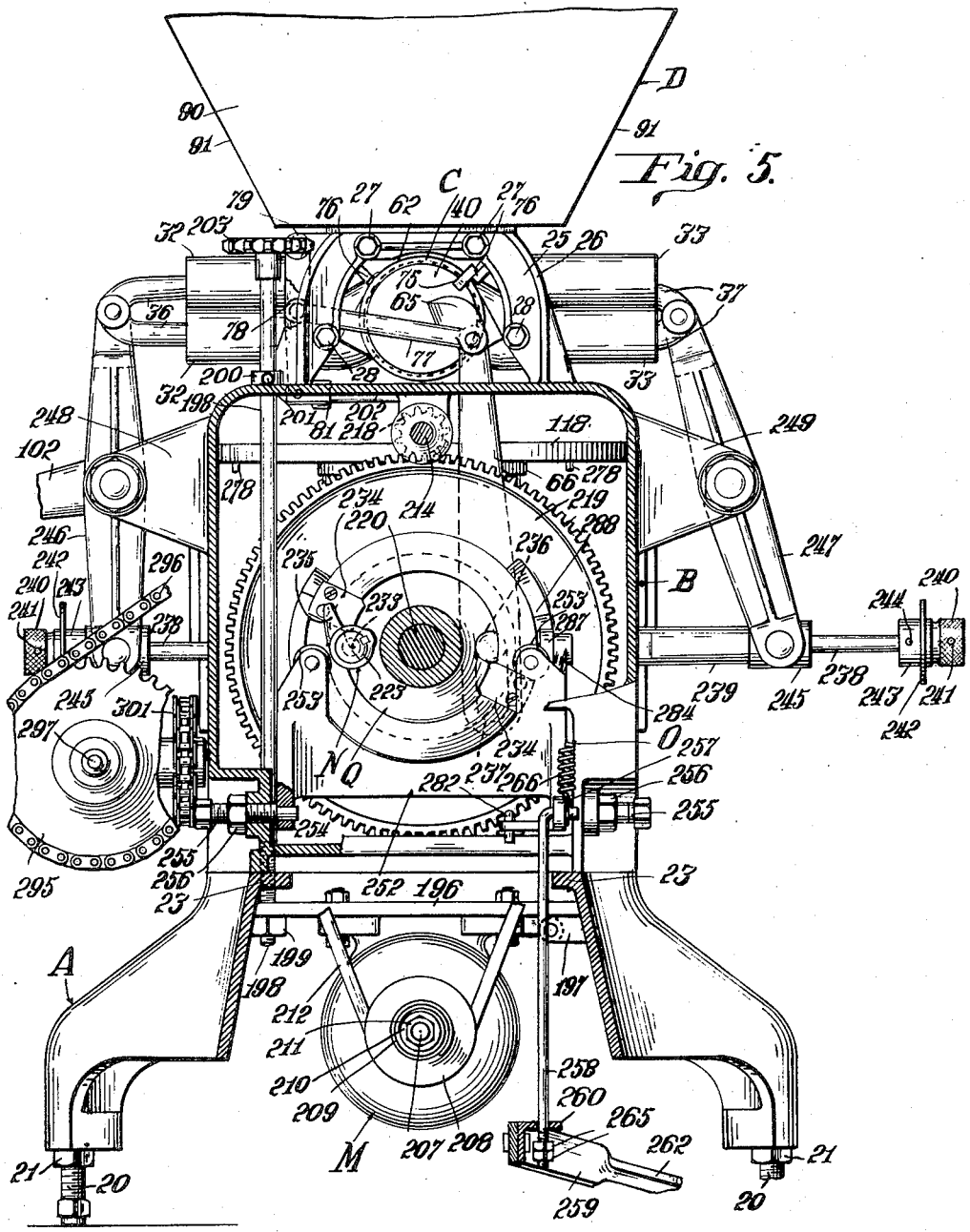

Aug. 4, 1936. H. R. PHILLIPS ET AL 2,049,722
FILLING MACHINE
Original Filed June 18, 1934  9 Sheets-Sheet 6
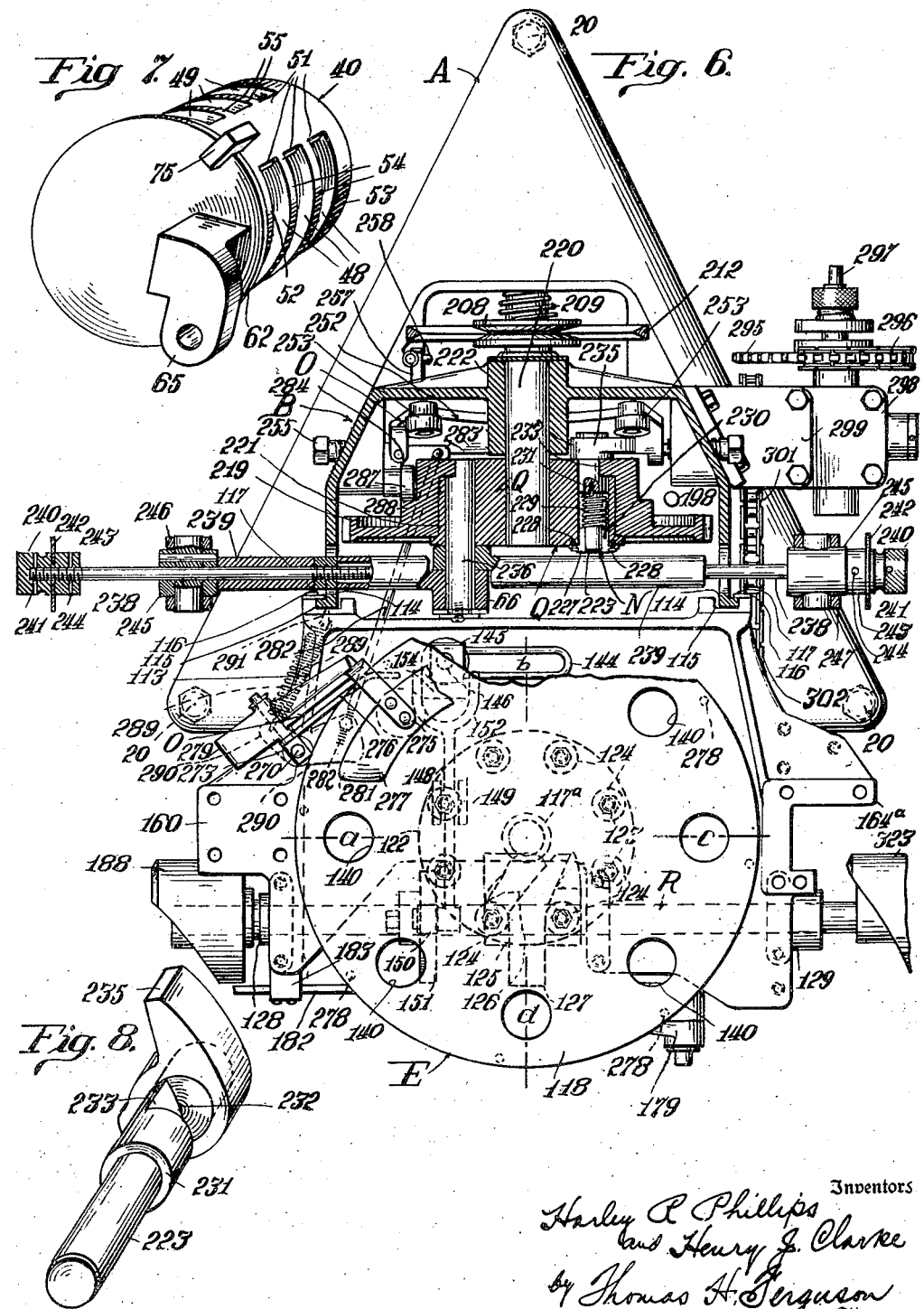
Inventors
Harley R. Phillips
and Henry J. Clarke
by Thomas H. Ferguson
Attorney

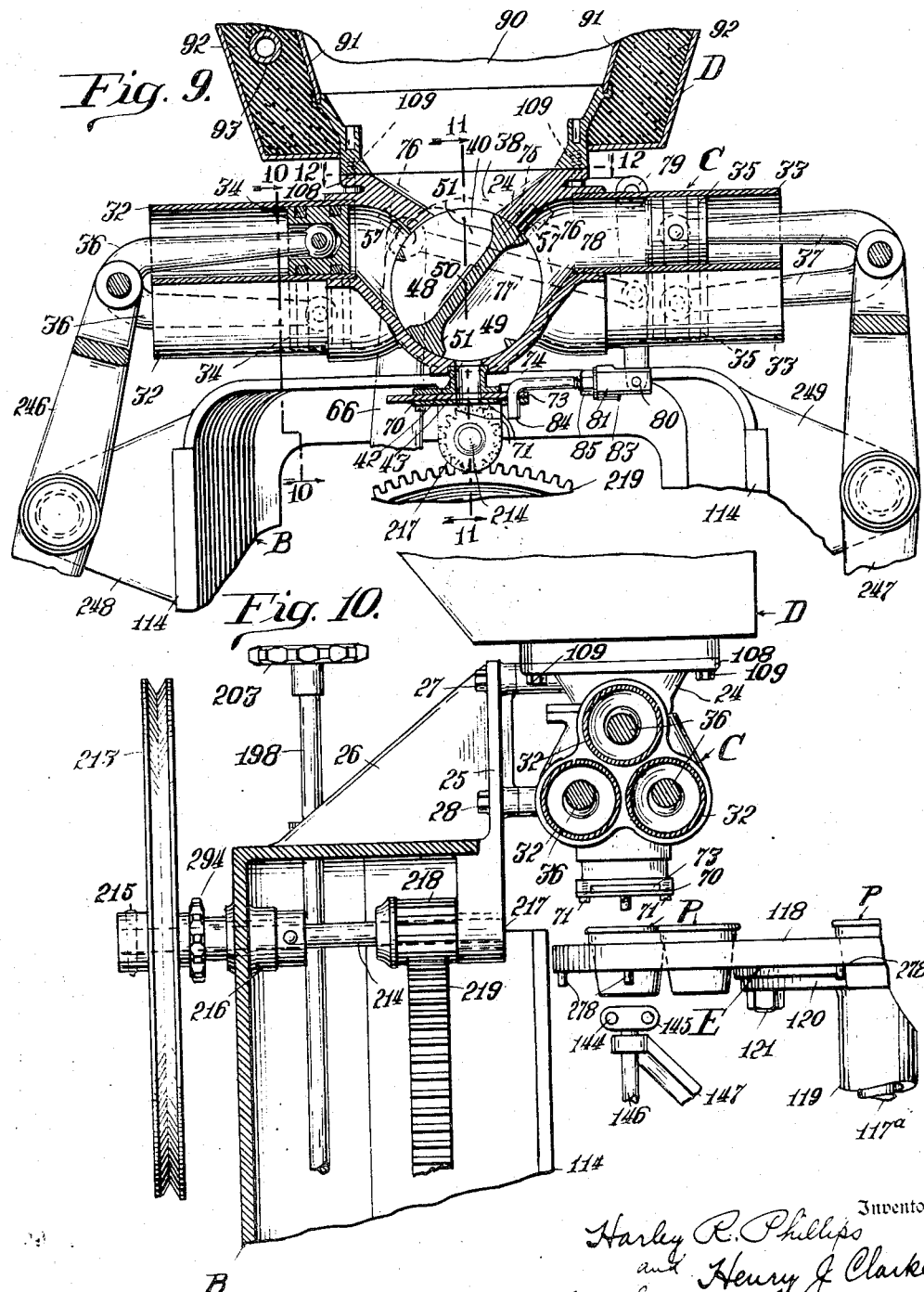

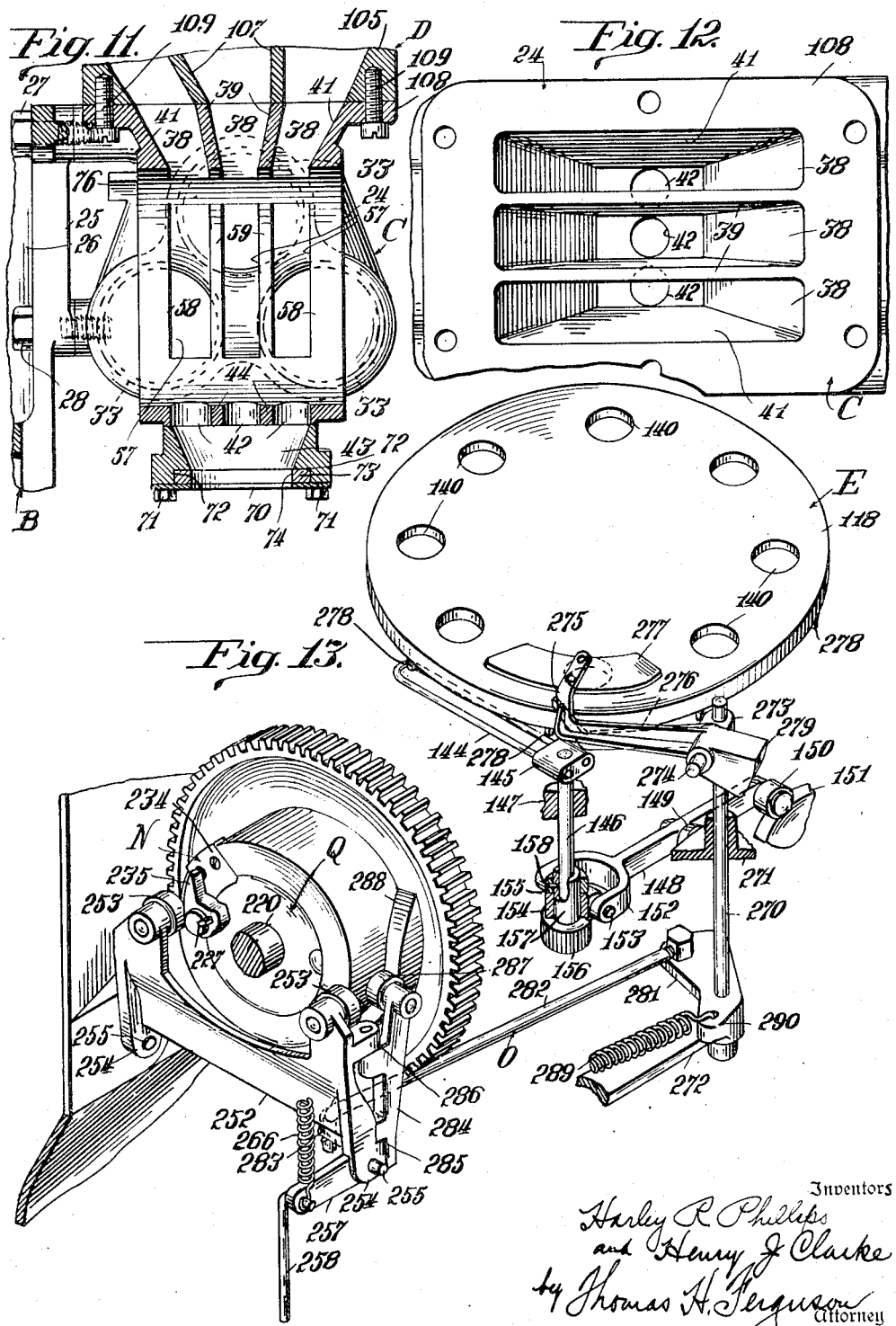

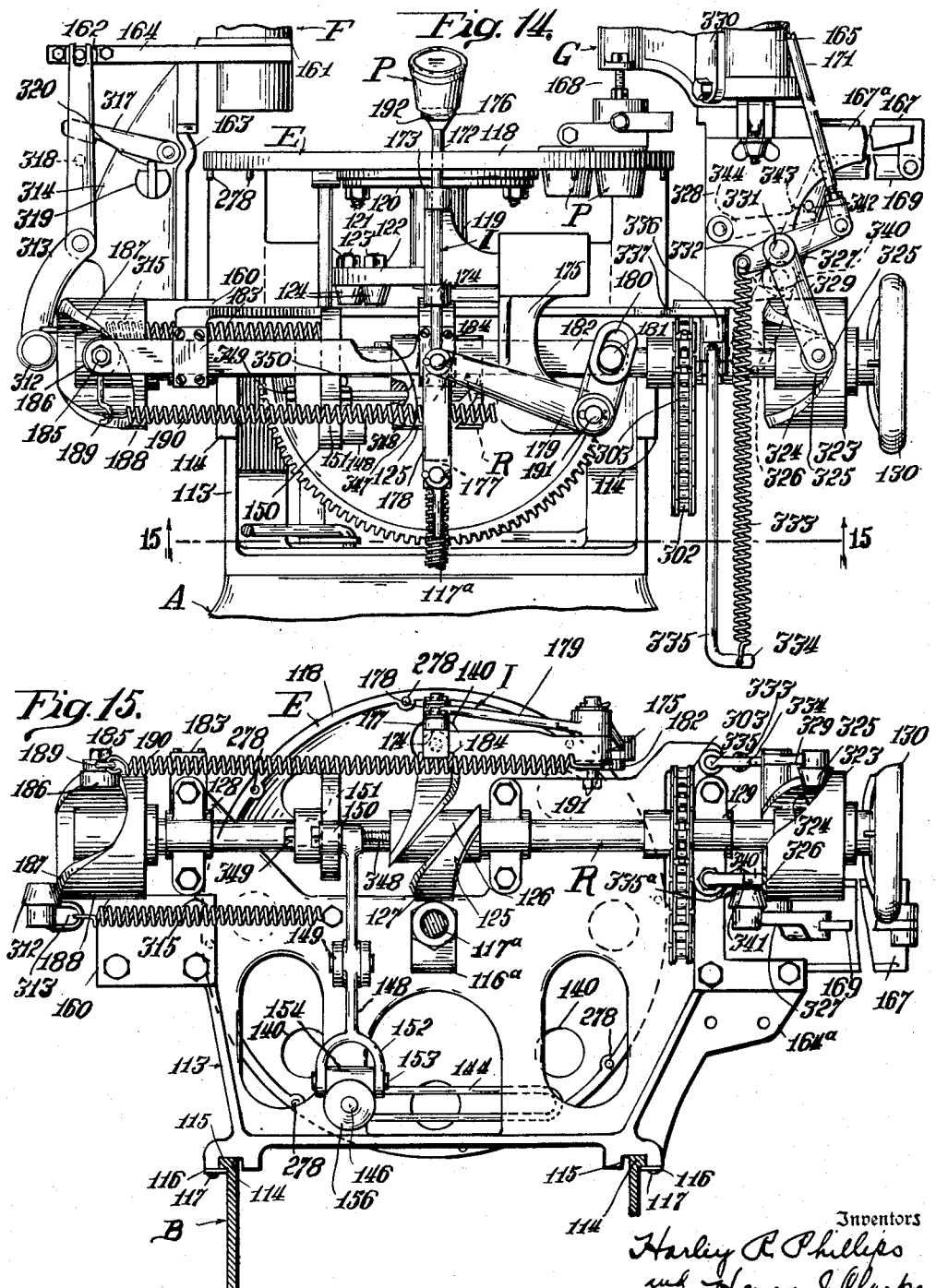

Patented Aug. 4, 1936

2,049,722

UNITED STATES PATENT OFFICE 2,049,722

FILLING MACHINE

Harley R. Phillips, Oak Park, and Henry J. Clarke, Chicago, Ill., assignors to Mojonnier Bros. Co., a corporation of Illinois Original application June 18, 1934, Serial No. 731,078. Divided and this application June 21, 1935, Serial No. 27,636

4 Claims. (Cl. 226—97)

The present invention relates to filling machines, and particularly filling machines for taking measured charges of a commodity from a bulk supply and depositing the same in cartons, cups or like containers which are commonly fed to the machine, filled with a commodity, capped and discharged automatically.

The invention is directed especially to the filling of cartons and the like at a greatly increased speed over prior ways of performing the same functions, in contrast to the measuring and filling operations. All the features having to do with the latter operations are claimed in our prior parent application Serial Number 731,078, filed June 18, 1934, out of which the application is carved as a division. The features having to do with the filling and handling of the cartons, together with the effective adjustments employed are covered by the claims of the present case.

The invention has to do with the handling of the container at the time it is being filled with the commodity. As is common with machines of this class the containers travel in a circuitous path from the point at which they are placed in the machine to a filling position and then on to a delivery point.

According to this feature of the invention the container is thrust upward against the lower end of the spout of the filling mechanism and held there at the time it is being filled with the commodity. The novel arrangement of parts by which this result is obtained is such that when the container has been brought into a position directly below the nozzle of the filling mechanism a movable member beneath the container forces it upward into engagement with the nozzle and yet does not dislocate it with reference to the conveying means but maintains it so that when the container is properly filled it may drop back into its normal position in the conveyer and be carried forward to the delivery point.

The invention furthermore has to do with the production of an ejector mechanism for delivering the filled and capped or covered container from the conveyer when the delivery point is reached.

In carrying out this feature of the invention the ejector which comprises a vertically movable member is thrust upward against the bottom of the filled and closed container and engages the same with sufficient force to free it from its seat in the conveyer and tumble it therefrom into a chute or other receptacle from which it may be taken and handled as desired. This ejector works in timed relation with movements of the conveyer and comes into play periodically to eject the filled containers successively as they present themselves at the delivery point.

Another feature of the invention resides in the indexing mechanism by which the conveyer which is commonly a rotating table is accurately set with reference to the various devices with which it is associated. Thus, where there is a container feeder and a container capper associated with filling mechanism, it is important that the table be accurately set so that a container in a given position on the table will present itself in proper position beneath the filling mechanism and again beneath the capping mechanism.

To the end that this may be properly accomplished an actuating drum cam is employed to rotate the table step by step and means are provided for adjusting this drum cam lengthwise of its axis so as to bring about a proper setting of the conveying table relative to its several operating positions, that is to say, relative to its container feeding position, its filling position, its capping position and its delivery position.

The invention also contemplates other features and advantages which will more fully appear upon consideration of the detailed disclosure.

The novel features of the invention have been worked out in the devising of a filling machine for the handling of plastic materials such as partially frozen ice cream, water ices and the like. The invention will therefore be described in that connection although it will be understood that the same is of broader application and need not be limited to the ice cream field.

The various features and advantages of the invention will be fully understood upon reference to the following detailed description taken in connection with the accompanying drawings, while the scope of the invention will be particularly pointed out in the appended claims.

In said drawings, Fig. 1 is a perspective view of a filling machine constructed and arranged in accordance with the present invention; Fig. 2 is a side elevation of the same machine viewed from the right as the parts are shown in Fig. 1; Fig. 3 is a transverse vertical section through the machine, the plane of section being indicated by the line 3—3 of Fig. 2; Fig. 4 is a central vertical section taken at right angles to the view in Fig. 3, the plane of section being indicated by the line 4—4 of Fig. 3; Fig. 5 is a transverse vertical section through the machine, the plane of section being indicated by the line 5—5 of Fig. 4; Fig. 6 is a horizontal section taken on a plane indicated by the line 6—6 of Fig. 4; Fig. 7 is a perspective view of the directing valve of the commodity measuring mechanism of the machine; Fig. 8 is a perspective view of a clutch pin forming part of the main clutch of the machine which operates to transmit power to drive the commodity feeding mechanism; Fig. 9 is a sectional view through the feeding mechanism, the plane of section being indicated by the line 9—9 of Fig. 4; Fig. 10 is a sectional view through one set of feeding cylinders showing the relation of the same to other parts of the machine, the plane of section being indicated by the line 10—10 of Fig. 9; Fig. 11 is an end elevation of one set of cylinders with certain portions of the adjacent structure shown in section, the plane of section being indicated by the line 11—11 of Fig. 9; Fig. 12 is a plan view of the directing valve casing, the position of the view being indicated by the line 12—12 and the associated arrows of Fig. 9; Fig. 13 is a diagrammatic view illustrating the trip mechanism for operating the main clutch of the machine to bring about the commodity feeding operations only when a container is properly positioned to receive the charge of the commodity resulting from such operation; Fig. 14 is a front elevation of the central portion of the machine, illustrating more particularly the mechanisms for operating the container holding table, the container feeder, the capper and the ejector; and Fig. 15 is an inverted plan view of the same portion of the machine, parts being shown in section taken on a plane indicated by the line 15—15 of Fig. 14. Throughout these views like characters refer to like parts.

In a few words, the machine consists of a base A, a main frame or casing B located upon the base, commodity measuring mechanism C located at the top of the main frame, a commodity hopper D for holding the commodity in bulk above the measuring mechanism, a rotary table mechanism E positioned at the front of the machine with its table located so as to receive charges from the measuring mechanism, and, associated with this table, a feeder F for supplying empty containers to the table, a capper G for capping the filled containers while still held by the table, and a delivery chute H into which the closed filled containers are deposited by ejector mechanism I.

The driving motor M is located within the base A and operates through suitable gearing to drive the measuring mechanism C and the table mechanism E. The train of gearing for driving the mechanism C includes a clutch N which is the main clutch of the machine. This clutch is controlled by trip mechanism O organized so as to be operated or not in accordance with the presence or absence of properly positioned containers P upon the table of the mechanism E. This train of gearing includes a crank disk Q which cooperates with suitable connecting rods and associated links to reciprocate the pistons and oscillate the directing valve of the measuring mechanism C. The other train of gearing which drives the table mechanism E is arranged to actuate a cam shaft R at the front of the machine and this shaft gives an intermittent step by step travel to the table which carries the containers. As this table advances it receives the containers P from the feeder F, these containers are filled one after the other with the commodity by the mechanism C, caps are applied to the filled containers by the capper G, and, finally, the filled and capped containers are ejected from the table into the chute H by the ejector mechanism I.

Going over these principal elements of the machine more in detail, we find that the base A is a shell of metal, preferably cast iron, having a general triangular form in plan with an adjustable foot 20 at each corner of the triangle. Each foot 20 is made adjustable so that the base may be set in a level position upon an irregular floor or other support. The adjustment is obtained in each case, by screwing the foot 20 into or out of the adjacent portion of the base and then holding it in adjusted position by a lock-nut 21. Obviously, the feet 20 may be made up in different ways, it being important only that it be possible to accurately level the base when setting up the machine. The upper portion of the base A is drawn in so as to fit against the under side of the frame B which is of box like formation and of considerably smaller overall horizontal dimensions than the base A. The frame B may be secured to the base A in different ways, as by means of bolts, a few of which, designated 22, are shown. To assist in connecting the two frame elements A and B, the base may be flanged at various points, as indicated by the flanges 23. These, however, are all matters of detail which may be worked out as desired by the designer and manufacturer.

The main frame B is, as stated, of box like formation and is preferably a metal casting. It comprises several brackets, extensions and other parts which may be better referred to when describing other parts of the machine which it supports.

The measuring mechanism C comprises a central metal casing or frame 24 which is secured on the forward side of a vertical wall 25 which extends upward from the main frame B and is laterally strengthened by webs 26 integral with the wall 25 and other adjacent portions of the frame B. The frame 24 constitutes the valve casing proper of the directing valve of the measuring mechanism C. It may be secured to the wall 25 in any desired way, but, preferably, this is acomplished by machine bolts 27, 28 extending through the wall 25 into threaded engagement with portions of the casing 24, as clearly illustrated.

The central member 24 of the mechanism C is preferably composed of metal suited to the commodity being handled and in its opposite ends it is provided in the illustrated embodiment, with three bores symmetrically arranged, as clearly shown in Fig. 10, and into these circular openings are fitted two sets of cylinders, three at each end of the member 24. The cylinders, designated 32 at the left and 33 at the right, as the parts are viewed in Figs. 3 and 9, are firmly secured in place by welding or otherwise and provide smooth bores on the interior for the travel of the associated pistons 34 in the case of cylinders 32, and 35 in the case of cylinders 33. The pistons 34 are provided with piston rods 36 and the pistons 35 are provided with piston rods 37.

Since, in the present embodiment, it is intended that three different commodities, or three different flavors of the same commodity, as for instance three different flavors of ice cream, are to be fed by the machine, the valve casing 24 has three pockets or channels 38 bounded by the walls of the casing 24 and intervening partitions 39. These are located near the top of the member 24 above the cylindrical chamber in which the directing valve 40 fits. These partitions 39 and the cooperating walls 41 determine the path of travel of the different flavors, or ingredients, as they pass into the chambers of the valve 40, and, as we shall see, they are kept separate until after they have passed the valve. They then pass through suitable openings, as the openings 42, located beneath the valve 40 in the bottom of the casing 24, as clearly shown in Fig. 11. These openings 42 may join in a large delivery opening 43. The different flavors, or ingredients, furnished by the separated passages will then be discharged into the container below in practically the same relation to each other as they occupy when they emerge from the passages 42. Of course, if desired the partitions 44 which lie between the passages 42, might be extended to a lower point to maintain still further the separation mentioned. In practice, however, it is found that the structure illustrated is quite satisfactory.

The valve 40 which occupies the cylindrical space in the casing member 24, is substantially cylindrical in general outline, as clearly shown in Fig. 7. This valve, however, is divided up into passages 48 on the one side and passages 49 on the other. These passages are provided by cutting away material from opposite sides so as to leave a central web 50 which extends axially of the valve and has thickened end portions 51 which strengthen the structure. In forming the channels 48 and 49 almost 180 degrees of the material is cut away on each side of the web 50. The channels 48 are bounded by the end walls 52, 53 and the intermediate partitions 54. In like manner the channels 49 are bounded by the same end walls 52, 53 and intermediate partitions 55. The member 24 is also provided with passages 57 which lead from the forward ends of the cylinders to the cylindrical seat of the valve 40. The passages leading from the cylinders 33, are shown more particularly in Fig. 11, and from an inspection of that view, it will be seen that they are bounded by the end walls 58 and the intervening partitions 59. The same arrangement of passages 57 is provided in association with the cylinders 32, and the same are similarly bounded. The cylindrical surface in which the passages 38 and 57 terminate, form the cylindrical seat of the valve 40.

The valve 40 is held in place by an end plate 60 which slips over a stud 61 formed on one end of the valve. The plate 60 is of sufficient size to extend beyond the valve and engage with the adjacent walls of the valve casing 24, as shown perhaps most clearly in Fig. 4. The plate 60 co-operates with a flange 62 formed at the opposite end of the valve. When it is desired to remove the valve 40, the plate 60 is removed and the valve drawn through the cylindrical opening in the casing 24 as will be obvious. Normally a frictional engagement is provided between the valve 40 and its casing 24 by the use of a coiled spring 63 which surrounds the stud 61 and bears at one end against the plate 60 and at the other end against the head of a thumb screw 64 which has its shank threaded into a suitable opening in the end of the stud. By adjusting the screw 64 the tension upon the spring 63 may be varied to increase or decrease the friction between the valve and its casing and hence decrease or increase the ease of rotation of the valve. The end of the valve wherein the flange 62 is located is provided with a crank arm 65 and it is through this crank arm 65 and the associated link 66 that the valve 40 is oscillated to bring it into its different commodity directing positions.

These positions, as clearly shown in Figs. 3 and 9, are such as to place the cylinders in communication either with the supply hopper D or with the outlet 43. Thus, in Fig. 3, the hopper is in direct communication with the cylinders 33, and the cylinders 32 are in direct communication with the outlet 43; while in Fig. 9 the hopper is in direct communication with the cylinders 32, and the cylinders 33 are in direct communication with the outlet 43. Because of the channels 48, 49 of the valve alining with the inlet passages 38 and the cylinder passages 57, it will be obvious that in each one of these positions there are three parallel paths through the valve from the hopper into one set of cylinders and from the other set of cylinders to the outlet. In this way, as before explained, the different flavors or ingredients of the commodity are kept separate until the delivery point of the valve is reached.

The lower end of the valve casing is provided with a plate 70 which is secured in position by suitable screws 71. Just above this plate the inner surface of the member 24 is cut away so as to provide grooves 72 in which a reciprocating cut-off plate 73 travels to cut off the stream of the commodity, such as ice cream, in a clean fashion at the instant that the carton beneath is filled and while the table is bringing another carton into filling position. The plate has a central opening 74 in it, which alines with the valve discharge opening 43 whenever the carton is in position to be filled. Just as the container is filled, the valve 40 moves to its new position and in doing so moves the plate 73 and thereby cuts off any of the commodity which may be adhering to the spout and allows it to drop into the container. While the table mechanism E operates to bring a new container into filling position, the plate 73 closes, and maintains closed, the opening 43, but, as soon as the valve 40 reaches its alternate position, the opening 74 again is in registry with the opening 43 ready for the discharge of commodity into the new container. The two positions of the valve 40, shown in Figs. 3 and 9, are established when the projection 75 on the valve 40 engages either of the stops 76, shown in dotted lines in Fig. 9. The stops 76 are projections on a portion of the valve casing 24. For the valve position of Fig. 9, the stop 75 engages stop 76 at the right, while for the position of Fig. 3, the stop 75 engages the stop 76 at the left.

The necessary reciprocations are given to the plate 73 through link mechanism which is actuated from the oscillating valve 40. This mechanism includes a link 77 which is pivotally connected at one end to the crank 65 of the valve and at the other end to an intermediate point of a link 78. The latter is pivoted at 79 to a fixed portion of the machine and its free end is pivoted at 80 to a two part adjustable link 81. The parts of this link are an angular rod 82 and a block-like member 83. The rod 82 has one end threaded into the block-like member 83. The angular end 84 of the rod 82 passes through an opening in one end of the plate 73. By threading the rod 82 into and out of the block 83, the length of the two part link may be adjusted so as to enable the plate 73 to be properly set. A nut 85 threaded upon the rod 82 is adapted to abut against the end of the block 83 and thus fix the adjustment of the parts relative to each other. With this link connection it will be seen that as the valve 40 oscillates between its stops 76, the crank 65 will pass from a low point illustrated in Fig. 3, to a high point illustrated in Fig. 9, and in so doing will move the plate 73 from an open position through a closed position and back again to an open position. This movement cuts off any portions of ice cream which may be depending from the outlet of the valve. The oscillation of the valve 40 in either direction performs this same operation.

The hopper D may be made of any desired construction according to the commodity being handled. In the present instance it comprises a vertical double wall 89 and inclined double walls 90, 91. These double walls are composed of metal sheets lined with asbestos or other insulating material 92 and contain tubes 93 which carry brine or other suitable cooling material taken in through an intake pipe 94 and withdrawn through an outlet pipe 95, all as is common in the art where ice cream is the ingredient handled. In this embodiment angle irons 96 are used in the frame work of the hopper D. A cover 97 of suitable metal construction is also employed. In certain instances the cover 97 may be given an inclined housing 98 having an opening 99 at one end for the passage of one end of a lever 100 used to agitate the material in the hopper as is sometimes done in hoppers of the kind, especially where ice cream is the commodity handled. The lever 100 is given a rocking motion by a connecting rod 101 which is reciprocated through the agency of a rocker arm 102 which is readily rocked by some suitable element of the machine, as, for example, by a portion of the driving gear for the feed mechanism C, as will be pointed out more full hereinafter.

The hopper D being intended for use with the three passage valve 40 is divided by partitions 103 into compartments 104 which communicate directly with the passages 38 of the valve mechanism. The sheet metal construction just described is connected to a basic casting 105 which has similar passages 106. The latter are separated by partitions 107. The arrangement is such that the compartments 104 and passages 106 and 38 are in each case in communication with each other, there being three such in the present embodiment. The basic casting 105 is provided with a lower face which rests upon and is secured to a peripheral flange 108 upon the casing member 24 of the valve structure. The connection is preferably made by bolts 109 which pass through openings in the flange 108 into threaded engagement with the casting 105, all as clearly shown.

The agitator within the hopper may take different forms. A suitable type is illustrated in United States Patent No. 1,476,996, granted December 11, 1933. Another simple form is illustrated in the drawings, particularly in Fig. 1. As there shown, the lever 100 is secured to a transverse shaft 110 suitably journaled in bearings located at the upper edges of the side walls 89 and 90 of the hopper. The shaft 110 carries arms 111, at least one for each compartment 104 of the hopper. Each arm carries a plunger rod 112 terminating in a plunger head 112ᵃ which is carried up and forced down in the commodity and so keeps it agitated and free to be fed through the passages 106 and 38 to the guiding valve 40 of the mechanism C. Guide rods 112ᵇ pass through openings in the plate or head 112ᵃ and are held in fixed position in the hopper compartment by being fixed to a portion of the hopper construction. The head 112ᵃ in each case, there being at least one for each hopper compartment, moves freely up and down along the guide rods. The rods will be inclined to suit the inclination of the hopper compartment in which it is located.

The table mechanism E includes a supporting frame 113 which is mounted on the forward side of the main frame B. The connection between the frame 113 and frame B is an adjustable one, preferably provided by cooperating tongues and grooves. In the embodiment illustrated the frame B is provided with vertical tongues 114 which cooperate with vertical grooves 115 in the frame 113. Preferably the tongue and groove arrangement is a dove-tailed arrangement or its equivalent. In the present instance the outer edge of each tongue 114 has a laterally projecting flange which also lies within the groove 115. Overhanging this flange is a strip 116 secured to frame 113 along the edge of the groove by any suitable means, as the screws 117. In this way the tongue 114 is locked within the groove 115 but is capable of vertical movement relative to it. Thus the front frame 113 may be readily adjusted in a vertical direction on the main frame B.

The frame 113 is provided with a bearing yoke 116ᵃ having a bearing at each end for the vertical stem or post 117ᵃ which pivotally supports the rotary table 118. The under side of the table 118 is provided with a casting 119. This casting includes an upper flange 120 which is apertured at suitable points for the passage of bolts 121 which are threaded into openings in the under side of the table 118. The casting 119 also carries a lower disk or flange 122 which is provided at regular intervals with vertical pins 123 which carry antifriction rollers 124. These pins are intended for cooperation with a drum cam 125 secured to the cam shaft R. The cam 125 is provided with a peripheral groove 126 into which the rollers 124 are adapted to extend. The space between these rollers, as clearly shown in Fig. 6, is just sufficient to nicely embrace the cam projection 127 which lies between the overlapping portions of the spiral groove 126. The cam faces are such that as the shaft R is rotated, they will contact with the rollers 124 and quickly advance the table 118 through the space of one step. Following this there will be a period of rest, and, then, as the cam again reaches its actuating position, the table 118 will be given another forward step. In this way the table 118 is advanced intermittently with a rest period following each step. The cam shaft R is suitably journaled in bearings 128, 129 provided on the under side of the yoke frame 116ᵃ. Between the casting 119 and the member 116ᵃ, a ball bearing 131 may be located so as to facilitate the travel of the table 118 about its non-rotary pivot 117ᵃ. In order to be able to rotate the shaft R by hand for the purpose of adjusting the position of the table 118 without starting the driving motor I, the shaft R is provided with a hand wheel 130.

The pivotal supporting shaft 117ᵃ, although not rotatable may be raised and lowered for the purpose of adjusting the height of the auxiliary frame 113 and the table 118 which it carries. This is brought about through the agency of a bracket 132 secured in any suitable way, as by bolts 133, to one of the walls of the base A. The bracket 132 provides a bearing 134 for the lower end of the post 117ᵃ. There is also an arm 135 which is apertured to allow for the passage of the post 117ᵃ and this arm is secured to an upright 136 upon the bracket 132 by suitable means, such as a bolt 137, and provides a space between it and the upper side of the bearing 134 for a nut 138 which has threaded engagement with the threads upon the lower end of the post 117ᵃ. The periphery of the nut 138 is provided with beveled gear teeth 139. When the nut 138 is rotated it raises or lowers the pivotal post 117ª with reference to the bracket 132. This means that the rotation of the nut 138 raises and lowers not only the post 117ª but also all that it supports. In other words, the adjustment of the post 117ª adjusts the frame 113 and the table 118. In this way the containers P carried in the different openings 140 of the table 118 are nicely positioned with reference to the outlet 43 of the valve mechanism C. Different ways of rotating the nut 138 may be employed. In the present instance the arm 135 is provided with a boss 141 on its under side and the boss embraces the post 117ª but is not in threaded engagement with it. A small opening in the face of the boss 141 permits the insertion of the end of a crank 142 and a beveled gear 143 on the crank 142 engages the teeth of the beveled gear 139 when the parts are thus assembled. The crank 142 may then be turned by hand and the result will be a rotation of the nut 138 either to raise or lower the shaft 117ª and its supported elements. The tongues 114 and grooves 115 maintain the frame 133 in proper alinement and in firm connection with the frame B.

This table mechanism E thus carries cartons or other containers step by step around with its table 118. Where automatic feeding and capping are employed the containers P are dropped from the feeder into the openings 140 as they appear in the container feeding position, designated *a* in Fig. 6. The containers are fed one by one into the openings 140 as they appear at this position. Then two advance steps of the table 118 carry each container from the feeding point *a* to the filling position *b* located directly beneath the spout or outlet 43 of the measuring mechanism C. Two more steps will advance the filled container to the capping position *c*. Again two more steps will bring the container to the ejecting position *d*. From the latter position each filled and capped container is ejected by the mechanism I into the chute H as previously mentioned.

When each container comes into the filling position *b*, it is given an upward movement so as to force its upper end into contact with the lower end of the outlet 43 of the valve mechanism. In other words, at the time of filling, the cup or other container is shoved up against the under side of the spout of the valve. This action is brought about by certain mechanism associated with the table mechanism E. In the embodiment illustrated the lower end of the carton is pressed upward by a double or looped arm 144 extending laterally from a small casting 145 secured to the upper end of a pin or rod 146 mounted for vertical movement in a bearing formed in a portion 147 of the frame structure. Vertical movement is given to these parts by an actuating lever 148 fulcrumed to a fixed part of the machine at 149 and bearing at one end an anti-friction roller 150 which is adapted to engage with a cam 151 on the cam shaft R. The end of the lever 148 which is adjacent to the vertically movable pin 146 is provided with a yoke 152 which forms part of a universal joint connection with the lower end of the pin 146. The yoke is connected by a horizontal pivot pin 153 to a block 154 which is free to rotate upon the sleeve 157 upon the pin 146. A collar 155 is secured to the upper portion of the sleeve 157 by a pin 158 or like means and serves to limit the upward movement of the block 154 upon the sleeve 157.

A knurled head 156 formed at the lower end of the sleeve 157 bears against the under side of the block 154 to limit its downward movement, the head 156 engaging the block 154 and holding it up against the collar 155. The interior of the sleeve 157 is threaded and so is the lower end of the rod 146. As a result of the threaded engagement of these parts, the block 157 may be adjusted up and down upon the rod 146 to give proper vertical adjustments to the container engaging arm 144.

The carton feed mechanism may vary greatly in construction. Indeed, the machine is designed so that different container feeders may be used upon the machine with satisfaction. Thus the bracket 160 shown at the left in Fig. 6 provides the usual support for the container feeder whatever its construction. The container feeder F is merely illustrative. In general, in feeders of this kind, it is only necessary to employ a magazine 161 for the containers P and in association with it some suitable reciprocating mechanism 162 for separating the lowermost container of a stack of containers and allowing it to drop into the positioned opening 140 in the table mechanism E. Inasmuch as the container feeder in itself forms no part of the present invention it will suffice to point out these essentials of the feeder mechanism and show how the machine, as disclosed, provides for the actuation of the reciprocating member of the feeder. In the present instance the main supporting bracket 163 of the feeder is secured at its lower end to the bracket 160 and the guideway 164 for the slide 162 is properly supported at the upper end of the bracket 163, all as particularly illustrated in Fig. 1.

In like manner the capping mechanism G may be variously constructed. Indeed the design is such that different makes of cappers may be used upon the machine with satisfaction. The bracket 164ª supports the capper G. The latter requires a magazine 165 for the caps 166 and in association with the magazine a suitable reciprocating member 167 which travels to and fro in a guideway 167ª and operates to pick off the lowermost cap and advance it to a position wherein it will be shoved downward by a plunger mechanism 168 into its final position in the top of the container. Since the cap advancing and plunger applying movements are the only movements required it will be obvious that the different mechanisms of different types of cappers may be readily actuated by the actuating mechanisms illustrated. In the present case the reciprocating mechanism 167 which picks off the lowermost cap is actuated by means of a reciprocating rod or link 169. In like manner a centrally pivoted lever 170 is actuated through a connecting rod 171 to give the plunger movements required.

By way of further disclosure of suitable feeder and capper mechanisms for use in association with the other mechanisms of the machine, attention is called to the following United States Patents, viz:—

1,171,996, Wilkinson, granted February 15, 1916.
1,260,432, Nias, granted March 26, 1918.
1,403,941, Cundall, granted January 17, 1922.
1,913,743, Borchert, granted June 13, 1933.

The chute H is of simple construction and need not be especially described. It will suffice to say that the same is preferably composed of metal and has side walls and is supported in inclined position with its upper end adjacent to the discharge position *d* at which position the filled and capped containers are ejected. These filled and capped containers enter the upper end of the chute and travel down the same to be further handled as may be necessary.

The ejector mechanism I comprises a headed rod 172 which is reciprocated vertically at suited timed intervals to engage the bottom of a container P in the position d of Fig. 6 to push it up out of the opening 140 in which it has rested during its travel from the feeding position a, wherein it was initially deposited upon the table 118. This upward movement and the pressure behind it are sufficient to dislodge the filled and capped container from its seat in the table and to tumble it into the chute H.

The rod 172 is provided with guide bearings 173, 174 in a bracket 175 secured to the forward edge of the frame 113. The rod is movable vertically and operates during rest periods in the travel of the table 118 to pass its head 176 upward, and then downward, through each opening 140 as it presents itself in the delivery position d of Fig. 6. A block 177 is secured to the rod 172 near its lower end. This block is pivotally connected to the lower end of a link 178 which is pivoted in turn at its upper end to the long arm of a bell crank lever 179 pivoted to a lower portion of the bracket 175. The short arm of the bell crank lever 179 is provided with a slot 180 which cooperates with a pin 181 which is fixed to and extends outward from one end of a slide bar 182 which is adapted to move to and fro in a direction substantially parallel to the cam shaft R and a short distance forward of it. Suitable guides 183, 184 for the actuating bar 182 are provided near the forward edge of the frame 113. The end of the bar 182 distant from the bell crank lever 179 is provided with a laterally projecting pin 185 carrying a cam roller 186 which rides upon the cam edge 187 of an annular cam 188 mounted upon and secured to the cam shaft R. The same end of the bar 182 carries a hook 189 for receiving one end of a coiled retractile spring 190 which extends lengthwise of the bar 182 and is secured at its distant end to the pivot pin 191 of the bell crank lever 179. The spring 190 holds the cam roller 186 up against the cam face 187 at all times. Consequently, the actuating bar 182 moves back and forth as the cam 188 rotates. The cam face 187 is such that there is one complete to and fro reciprocation of the bar 182 for each rotation of the shaft R, with a rest interval before each to and fro reciprocation is begun. As the bar 182 is reciprocated, the bell crank lever 179 is rocked and the ejector head 176 is moved up and down through a complete cycle. In its upward movement, it strikes against a filled container P, if one is in position, and carries it upward beyond the table 118 out of the opening 140 in which it had rested and directs it laterally into the upper end of the chute H. If no container is in the opening which presents itself then the ejector passes up and down without performing any ejecting function. A distinct tilt is given the filled and capped container toward the chute by having the head 176 strike the under side of the container a little toward the center of the table 118 from the exact center of the container bottom. The action of the ejector upon the container to hold it against a too rapid tilting toward the chute is provided by giving the head 176 a forwardly projecting loop 192 which also engages the bottom of the container during the ejecting operations.

Having gone over the different mechanisms of the machine and having considered their parts and relative operations, it may be well now to consider the trains of gearing and other elements which bring about the operations of the various mechanisms from the source of driving power.

To begin with, the motor M is preferably located within the base A and is secured to the under side of a hanger 196. The latter is in the form of a slab or plate and is pivoted to lugs 197 secured to the inside of one wall of the frame A. The opposite end of the hanger 196 is apertured for the passage of a rod 198, and a nut 199 is threaded on the lower end of the rod 198 and positions the rod with reference to the hanger. The downward movement of the rod 198 is limited by a collar 200 which is secured by any suitable means, as a set screw 201, to the rod 198 and the collar 200 engages the upper surface of the top 202 of the frame B to limit the downward movement of the rod. A hand wheel 203 is likewise secured to the upper end of the rod 198. The rod also passes in threaded engagement through a threaded portion 206 of the bottom of the main frame B. With this construction it will be seen that as the rod 198 is rotated it will be raised and lowered within the limits permitted by the end of the hanger 196 and the collar 200, to move the plate or hanger 196 up and down about its pivotal point. In this way the position of the motor may be changed in elevation, as desired, within certain limits.

The armature shaft 207 of the motor M, which is preferably an electric motor of suitable design for the purpose, is provided with an expansible pulley 208. This pulley is of well known construction and includes two parts which may be easily forced apart in opposition to the pressure of a compression spring 209 acting between one of the members of the pulley and a stop member 210, such as a washer or the like, secured to the pulley shaft by a nut 211 or other means. These pulleys are well known and form no part of the present invention. Illustrations of them will be found in the following patents:

966,303, Borlase, granted August 2, 1910.
1,350,670, Ritter, granted August 24, 1920.
1,662,654, Abbott, granted March 13, 1928.

With this kind of pulley 208 it is possible to lower the speed of the gearing driven by the motor by simply forcing the pulley members apart slightly and decreasing the effective diameter. Allowing the pulley members to approach each other produces the opposite result, namely an increase in speed. Because of the weight of the motor M it will be obvious that when the hand wheel 203 is turned so as to drop the motor then the effective diameter of the pulley engaged by the belt 212 is decreased and with a constant speed motor the speed of the pulley 213 driven by the belt 212 will be reduced with a corresponding speed reduction in other parts of the gear train. On the other hand, if the motor be raised, then the effective diameter of the pulley 208 will be increased and the speed of the pulley 213 increased.

The pulley 213 is mounted upon a transverse shaft 214 and secured to the same by a transverse pin 215 or the equivalent, and the shaft 214 is journaled in bearings 216 and 217 formed in portions of the upper part of the main frame B. The shaft 214 carries a pinion 218 which meshes with the gear wheel 219 mounted to rotate about the axis of a transverse shaft 220. The shaft 220 is not driven at all times by the wheel 219 but is driven only when the clutch N operates to connect these two elements. In the particular clutch employed, which is of the pin type, the gear wheel 219 has a large central bore which fits over and travels upon the peripheral surface of the crank disk Q, indicated at the point 221 in Fig. 6. The disk Q is keyed or otherwise secured to the stud shaft 220 which shaft extends forward from the bearing 222 formed in the rear wall of the frame B and carries the crank disk Q at its forward end.

The clutch mechanism N includes a pin 223 which is mounted in and travels with the crank disk Q and may engage, or may not engage, projections upon the gear wheel 219 according to the setting of the pin. The pin 223 is mounted in a tubular casing 227 which is secured in a suitable bore in the crank disk Q at its periphery, preferably by screws 228. The pin 223 is reduced in diameter at its inner end to provide space for a torsion spring 229. The latter is secured at one end by thrusting the end of the spring into a small opening 230 formed in an adjacent shoulder of the pin. The other end of the spring is similarly held in a hole 231 provided in the casing 227, as most clearly illustrated in Fig. 6. The spring 229 tends to hold the pin 223 with its slot 232 extending radially of the crank disk Q. When thus extended the wall 233 forming the bottom of the slot 232 engages with one or other of the clutch plates 234 secured to the gear wheel 219. This is the normal position of the parts and the position in which the crank disk Q and driving gear wheel 219 are clutched together. This is the position in which the spring 229 normally holds the parts. When it is necessary to disconnect the crank disk from the driving gear wheel 219, then the pin 223 must be rotated from its normal position and rotated against the torsional pull of the spring 229, until its wall 233 lies circumferentially with reference to the crank disk Q. When this position is taken, the projecting clutch members 234 upon the gear wheel 219 will pass freely through the slot 232 and will not operatively engage the pin or any part of it to drive the crank disk. This movement out of the normal spring retained position is brought about by actuating a nub or projection 235 secured to or forming an integral part of the pin 223.

Passing for the moment a consideration of the control mechanism for bringing about this unclutching movement of the clutch pin, it may be assumed that the parts are in clutching position and the balance of the gear train brought into play by the clutch considered. As soon as the crank disk Q is rotated, it carries around its crank pin 236 with resulting operations of the commodity filling mechanism C. The first of these movements which may be considered is the oscillating movement of the valve 40. As previously pointed out, this valve is oscillated to and fro between its stops 76 by the link 66. The latter has a slot 237 through which the crank pin 236 extends. The result is that as the crank disk Q rotates in the direction of the arrow as shown in Fig. 3, there are intermittent oscillations of the valve 40, the valve being moved to and fro by the thrust and tension action of the link 66 occurring when the pin 236 engages the opposite ends of the slot walls and the intervening rest periods occurring while the pin is traveling within the slot.

The same rotation of the crank disk Q actuates similar but oppositely disposed connecting rods each of which includes an outer portion 238 and an inner portion 239. The inner portion 239 of each pin is journaled on the crank pin 236 and at its outer end it is bored out and threaded to receive the inner threaded end of the rod 238 which forms the outer portion of the connecting rod. At its outer end each extension rod 238 carries a knurled head or block 240 which is fixed to the rod in any suitable way as by a pin 241. Inward of the head 240 is a guard 242 which resembles a washer. Another block 243 occupies a position on the rod 238 just inward of the guard 242. This block is also preferably fixed to the rod 238 as by a pin 244. The spaces between the blocks 243 on the one hand and the outer ends of the connecting rod members 239 provide travel-ways for the blocks 245. The latter are pivotally secured to the lower ends of levers 246, 247 which in turn are pivotally connected at their upper ends to the piston rods 36 and 37 respectively. These levers 246, 247 are pivoted at intermediate points to brackets 248 and 249 respectively. These brackets extend outwardly from adjacent portions of the main frame B.

It may be noted at this point that the lever 246 is formed integral with and virtually is part of the rocker arm 102, previously referred to, by which the connecting rod 101 and associated agitator mechanism in the hopper D are operated. Each time the lever 246 is rocked through the action of the crank pin 236 and associated connecting rod (made up of the parts 238, 239), the agitator is moved up and down, or otherwise as the case may be, depending upon the type of agitator employed.

In operation it will be seen that as the crank shaft rotates, the pistons 34, 35 and the intervening directing valve 40 operate in timed relation to bring about proper fillings of the measuring cylinders followed by discharges from the same into the positioned containers. The lost motions provided, in the case of the valve 40 by the pin 236 cooperating with the slot 237, and provided, in the case of the pistons 34, 35 by the blocks having a free travel upon the connecting rod extensions 238, give the necessary timed relation between the filling and discharge operations of the pistons and valve of the measuring mechanism C. The lost motions provided by the travel-ways for the blocks 245 upon the rods 238 may be varied at will to vary the measure of the commodity taken up by the respective measuring cylinders. This variation in the case of each set of cylinders, 32 or 33 as the case may be, is provided by adjusting the outer portion 238 of the connecting rod relative to its inner portion 239. This is done by the operator grasping the appropriate knurled head 240 and turning the corresponding rod 238 into or out of the part 239 as may be required to lengthen or shorten the stroke of the pistons, 34 or 35, to vary the measure of the charge of commodity taken from the supply. The guard 242 protects the fingers of the operator from being injured by the block 245 when adjustment is made without stopping the machine.

In connection with the operation of the pistons 34, 35 and the valve 40, it should be noted that the valve 40, when at rest, occupies either the position of Fig. 3 with the dividing partition 50 extending upward toward the left or the position of Fig. 9 with the same partition extending upward toward the right. It oscillates between these positions and between the travel periods there are rest periods. These rest periods occur while the crank pin 236 traverses its slot 237, first in one direction and then in the other. While the valve 40 is traveling the pistons 34, 35 are at rest due to the blocks 245 passing along the travel-ways upon the rods 238. On the other hand while the valve 40 is at rest the pistons 34, 35 travel first to the right and then to the left as the parts are viewed in Figs. 3 and 9. Thus, in the rotation of the crank pin 236, there are four periods corresponding to four quadrants on the disk Q. While the pin 236 traverses one quadrant, which we may call the first, the valve 40 remains at rest in, say, the position of Fig. 9, and the pistons 34, 35 move to the left as shown in that figure, the pistons as there shown being ready to begin their stroke to the left to discharge cylinders 33 and fill cylinders 32. During the next quadrant, the second, the valve 40 is moved to the position of Fig. 3 and the pistons 34, 35 remain at rest, the parts being shown at the beginning of the quadrant period. During the traverse of the third quadrant by crank pin 236, the valve 40 remains quiescent and the pistons 34, 35 move to the right, thereby emptying cylinders 32 and filling cylinders 33. The fourth quadrant brings a movement of the valve 40 back to the first position considered while the pistons remain quiet. Thus, there are alternations in the operations of the valve and pistons and through two positions for each.

The control mechanism O brings about an operation of the clutch N in response to conditions present upon the container carrying table 118 of the table mechanism E. Normally containers are fed at regular intervals into the openings 140 of the table and there is no reason for stopping the regular operations of the filling mechanism C. However, should it happen that an opening 140 presents itself at the filling position b (Fig. 6) without a container in it, then provision must be made to prevent the operation of the filling mechanism C. The control mechanism O performs this function. When the containers appear regularly the clutch N remains in clutching position and the parts move continuously without interruption. However, when an opening 140 appears without a container in it, then the mechanism O operates to throw the clutch into unclutching position. This allows the parts of the mechanism C to stop during the travel of the table through another step. If, again, the opening 140 is devoid of a container, the unclutching condition continues for another step. Finally when a properly filled opening 140 presents itself, the clutch is thrown to its clutching position and the filling operations continue.

As previously pointed out, the clutch pin 223 occupies two positions. In one of these the face 233 is practically tangent to the periphery of the crank disc Q, and in the other position it is shifted into a substantially radial position, wherein it engages one or other of the clutch plates 234. The coiled torsion spring 229 which surrounds the clutch pin 223 tends to hold the face 233 of the pin in the clutch engaging position. This means that the projection 235 at the end of the pin occupies the position of Fig. 5 when the pin is not interfered with by anything extraneous to the clutch itself. In other words, when unrestrained the torsion spring 229 tends to hold the projection 235 in the position shown in Fig. 5, which is the clutch engaging position.

For the purpose of moving the projection 235 into the unclutching position, wherein the wall 233 at the bottom of the channel 232 lies in its tangential position, there is provided a yoke-like frame 252 having upwardly extending arms provided with anti-friction rollers 253. The frame 252 is provided with downwardly extending lugs 254 through which pivot pins 255 extend. The latter are threaded through threaded openings in portions of the lower part of the main frame B. Lock nuts 256 on the pins 255 serve to hold them in adjusted positions. At one end the frame 252 is provided with a crank arm 257 and the outer end of this crank arm is connected by a rod 258 to an intermediate point in a pedal lever 259, the lower end of the rod extending through an opening in an angular projection 260 carried by the lever 259. The lever 259 is pivoted to projections 261 extending inward from the base A at a point adjacent to its rearmost foot 20. The forward end of the lever 259 is provided with a flattened portion 262 for the foot of the operator to engage when he wishes to press the lever downward. The lever 259 is normally held in its uppermost position by a spring 263 which is secured at one end to the lever and at the other end to a horizontal portion 264 of the base A. Adjusting nuts 265 serve to determine the throw of the frame 252 under normal pedal depression. The downward movement of the pedal may be limited in any desired way and in the present instance is movable until it comes in contact with the floor which serves as a stop to limit its downward movement. The frame 252 is additionally yieldingly held in nub-engaging position by a coiled tension spring 266 which is secured at one end to the crank arm 257 and at its other end to a fixed part of the frame B. The nub-engaging position of the frame 252 is that position which it occupies when its anti-friction rollers 253 are up near the face of the crank disk Q and in position to engage the nub or projection 235 on the clutch pin.

As before explained, if the rollers 253 are positioned close to the face of the cam disk Q then the clutch pin will be thrown to non-engaging position and the driving shaft 220 will be stopped until the frame 252 is moved away from its position close to the face of the crank disk. When in this outer position, the rollers 253 are not in the path of travel of the nub 235 upon the clutch pin, and consequently the crank disk and driving gear wheel 219 remain in clutched position and therefore move together as a unit.

When it is desired to run the machine continuously without having cartons in the openings 140 of table 118, then it is only necessary to press down upon the pedal lever 259 and thus keep the rollers 253 out of possible engagement with the projection 235 on the clutch pin. This will leave the pin free to act under its spring force and hold the parts in clutched engagement. However, when containers are being fed to the table mechanism then the foot may be removed from the pedal 259 and the mechanism will operate entirely under the control of the control mechanism O.

In considering this mechanism O, it will be noted that it extends in its operations from the table 118 to the clutch mechanism N. Adjacent to the table 118 is a vertical rock shaft 270 suitably journaled in portions 271 and 272 of the main frame B. At the upper end of this rock shaft 270 is a bearing block 273 which carries a laterally projecting pivot pin 274. The pivot pin 274 carries a floating feeler arm 275 and a pin engaging arm 276. The arm 275 extends at its free end over the edge of the table 118 and carries on its under side a plate 277. The arm 276 extends at its free end below the table 118 and in its uppermost position is operative to engage downwardly projecting pins 278 on the under side of the table near its periphery. The arrangement is such that the arms 275 and 276 move together, being both connected together and pivoted on the same pivot pin 274. The arms 275 and 276 together with the plate 277 are counterbalanced to a limited extent by the weight 279 located to the right of the pivot pin 274, as the parts are viewed in Fig. 13. The weights of these parts, however, are such that the weight of the parts to the left of the pivot pin slightly exceeds that of the weight to the right, as the same are viewed in Fig. 13. The counterbalance provided by the weight 279 thus prevents the possibility of the plate 277 pressing too heavily upon the containers P in the openings 140 as they present themselves beneath the plate. In other words, by counterbalancing in this way, the pressure upon the containers is very light and yet there is sufficient movement of the parts to cause the arm 276 to engage the pins 278 whenever containers are in position and to allow the arm 276 to miss the lower ends of the pins 278 when containers are not in position.

It will be seen that when a container P is presented to the plate 277, the latter will be moved upward with a corresponding elevation of the pin actuated arm 276. As the latter is actuated by a pin 278, the rock shaft 270 is rocked so as to move the clutch control rollers 253 out of the path of travel of the clutch pin nub 235. This transfer of motion is brought about by a rock arm 281 secured to a lower portion of the shaft 270 and acting through a link 282 and a crank arm 283 to oscillate a frame 284 supported by the frame 252 and carried by vertical pivot pins 285, 286. The oscillatory frame 284 carries a roller 287 at its upper end and this roller cooperates with a cam 288 located on the face of the gear wheel 219. The various parts in this train of connections are normally held in position to cause the filler arms 276 to engage the control pins 278 whenever the arm 276 is properly elevated and at the same time to yieldingly maintain the vertically pivoted frame 284 with its roller 286 out of the path of travel of the cam 288. This is done by means of a coiled tension spring 289 which is connected at one end to a crank arm 290 associated with the rock shaft 270 and at the other end to a fixed portion 291 of the main frame B of the machine.

The frames 252 and 284 have a cooperating relation. Whenever the frame 284 is in its normal position, its roller 287 will not engage the cam 288, as already explained. However, when the control mechanism is actuated so as to throw the member 284 against the action of its spring far enough to bring its roller 287 into the path of travel of the cam 288, then the action of the cam upon the roller will press the frame 284 and with it the frame 252 outward away from the face of the crank disk Q.

The operation thus brought about through the action of the control mechanism O is the same in ultimate effect as if the pedal 259 were operated and the frame 252 thrown outward away from the disk face as before explained. This time, however, the action has been caused by the presence of a container in an opening 140 in the rotary table 118. Since the frame 252 is thrown outward, the clutch pin will remain with its nub 235 in the position of Fig. 5 and a unitary rotation of the driving gear wheel 219 and the clutch disk and shaft 220 will occur. This action will bring about a proper operation of the filling mechanism C when the container which causes the operation of the control mechanism O is in position to receive its charge of commodity.

Obviously, if a container is not present in an opening 140, the levers 275 and 276 will remain in their lowermost positions and there will not be an engagement of the arm 275 with a pin 278, and, consequently, there will be no rocking of the shaft 270 with the resulting movement of the clutch controlled rollers 253 away from the face of the crank disk Q. Therefore, in such case, the nub 235 will be rocked to the full line position of Fig. 5 and the face 233 of the pin will slip over the edge of the disk Q and there will be no driving of the latter by the driving gear wheel 219. This, of course, means that there will be no actuation of the filling mechanism C at a time corresponding to the presenting of the opening 140 at the filling position b.

Thus, it will be seen that during the continued operation, where proper containers successively present themselves, there will be intermittent actuations of the control mechanism O, one actuation for each container, and the clutch will remain in clutching position. In contrast to this, if an unoccupied opening presents itself, then there will be a corresponding failure of the mechanism O to operate and a corresponding cessation of the operation of the filling mechanism C. Thus, the filling of the containers is placed under the control of the containers themselves. And, yet, if desired, the machine may be advanced through any number of steps by use of the pedal mechanism even though containers are absent from the table.

Turning now to the train of gearing by which the cam shaft R is operated it will be seen that the shaft 214, which is driven directly from the motor M through the agency of the belt 212 and the pulleys 208 and 213, is provided with a sprocket wheel 294 which is employed to drive a sprocket wheel 295 through the agency of a sprocket chain 296. The sprocket wheel 295 is carried upon the outer end of a worm shaft 297 mounted within a gear box 298 suitably supported by a bracket 299 secured to a portion of the main frame B. The worm shaft 297 is provided with a worm gear wheel 300 which meshes with a gear wheel 300ª positioned at right angles to the wheel 300 upon a transverse shaft 300ᵇ, which carries at its outer end a sprocket wheel 301. The worm shaft 297 and worm wheels 300 an 300ª form within the box 298 a gearing by which the direction of travel is changed 90 degrees. In this way the sprocket chain 302 travels in a plane at right angles to that in which the chain 296 travels, and is in position to engage a sprocket wheel 303 upon the end of the cam shaft R, as clearly illustrated. The sprocket chain 302 has one stretch which engages with a guide sprocket wheel 304 journaled in suitable bearings carried by the vertically adjustable table frame 113. The other stretch of the sprocket chain 302 similarly engages a sprocket wheel 306, which is carried at one end of a lever 307. The latter is intermediately pivoted to a bracket 278, also carried by the table supporting frame 113. The end of the lever 307 distant from the sprocket wheel 306 is constantly drawn upon by a coiled tension spring 309 which is secured at one end to the lever 307 and at its other end to a fixed point of the frame 113. The two sprocket wheels 304 and 306 together with the yielding mounting of the latter constitute a belt tightener for the sprocket chain 302 and by reason of its belt tightener action, proper tension is maintained in the chain at all times for transmission of power to the cam shaft R whatever the vertical adjustment of the table supporting frame 113 may be, and, indeed, the same will continue even while the table supporting frame is being adjusted.

As previously pointed out the cam shaft R is provided with the cam 188 having a peripheral cam face or edge 187 which cooperates with a cam roller 186 to bring about vertical actuations of the ejector mechanism I. This same cam face 187 also cooperates with a cam roller 312 rotatably mounted on the lower end of a lever 313. The latter is pivoted at an intermediate point to a supporting web 314 which extends outward from the bracket or frame 163 of the feeder F. The upper end of the lever 313 is connected with the outer end of the reciprocating feed member 162 by a pin and slot connection, shown most clearly in Fig. 14. Normally the roller 312 rides on the cam edge 187 and is held in close contact with the same by a coiled tension spring 315 which is secured at one end to the lever 313 adjacent to the roller 312 and at its opposite end to some relatively fixed part of the machine. As the shaft R rotates the lever 313 oscillates, there being one complete to and fro reciprocation of the lever for each revolution of the shaft. Each such to and fro movement of the lever 313 gives the feeding member 162 a forward and return stroke to feed one of the containers to the table 118.

When it is desired to stop the feeder it is only necessary to hold the roller 312 away from the cam face 187. This is preferably done by employing a hook 317 pivoted to the web 314 so that its hooked end may engage a pin 318 on the upper portion of the lever 313 as clearly illustrated. As long as the hook 317 operatively engages the pin 318 the feeder will be held inactive. In order to easily manipulate the hook 317, that is to say, to lift it out of its position of operative engagement with the pin 318 on the one hand and on the other hand to allow it to drop into said position under its own weight, a cam bar or rod 319 may be employed. This bar is mounted for frictional rotation in the web 314. By its frictional engagement with its bearing the rod may be easily rotated to any desired position and when rotated to such position it will be held there by the frictional contact of the parts. The bar 319 is provided with a projection 320 which operates to engage the under side of the hook 317 to raise the latter above its position of engagement with the pin 318. It will be noted that the pivotal axis of the hook 317 is adjacent to the axis of the cam bar 319. This brings about the proper actuation of the hook into engaging and non-engaging positions in response to the rotations of the bar 319. Instead of employing the projection 320, obviously the bar might be otherwise shaped or equipped so as to give the necessary movements to the hook when the bar is rotated. As long as the bar 319 remains in that position which holds the hook 317 elevated, the feeder F will be operated. As soon as the bar 319 is rotated so as to allow the hook 317 to operatively engage the pin 318, then the roller 312 will be held out of engagement with its cam face and the operations of the feeder will be discontinued.

When it comes to the capper G then two movements must be communicated to its parts, one to the cap shifting member 167 and the other to the plunger 168. These movements are brought about through the agency of a cam 323 upon the cam shaft R, the cam 323 being quite similar to cam 188 just referred to in connection with the operations of the feeder. The capper cam 323 has a cam face or edge 324 which cooperates with two cam rollers 325 and 326 to bring about two required movements of the capper parts.

The cap feed member 167, as before noted, is reciprocated by the connecting rod or link 169. This link is pivotally connected at its inner end to the upper end of a lever 327 which carries the cam roller 326 at its lower end and is pivoted at an intermediate point to the frame 328 of the capper G. It will be seen by reference to the shape of the cam edge 324 that there is one complete reciprocation of the cap feeding member 167 for each complete rotation of the cam shaft R. This reciprocation removes a cap from the lower end of the stack in the capper magazine 165 and shifts it into position to be actuated by the plunger 168. The shape of the cam face 324 is such that the cam rollers 325 and 326 operate alternately to bring about their respective movements. Consequently the plunger 168 will not operate until after the capper feed has operated and properly placed a cap in possition for application to the container. Generally speaking, while the plunger 168 is inactive the feed member 167 is active to advance a cap and while the feed member 167 is inactive the plunger 168 is active to apply the cap to the container.

The cam roller 325, which is employed in actuating the plunger 168, is connected to the lower end of a bell crank lever 329 which is pivoted to the frame 328. The short arm of the bell crank lever is pivotally connected at its outer end to the lower end of the actuating link 171 which, as previously pointed out, rocks the lever 170 to bring about the operation of the plunger 168. In this connection it may be noted that the lever 170 is pivotally mounted upon the upper end of a supporting arm 330 which is pivoted at its lower end to a portion of the frame 328 of the capper. The supporting link 330 provides a shifting fulcrum for the lever 170 so as to permit a proper lineal movement of the plunger 168 as the latter is actuated to apply the cap to the container.

The bell crank lever 329 is mounted on a pivot 331 carried by the frame 328 and the pivot 331 also carries an arm 332 which is either integral with the bell crank lever 329 or secured so as to move with it. The outer end of the arm 332 has a spring 333 connected to it. The spring 333 is a coiled tension spring which is connected at its upper end to the arm 332 and at its lower end to an angular extension 334 at the lower end of a supporting rod 335 which is mounted at its upper end in the frame B of the machine, the particular connection being made by securing the upper end of the rod to a boss 336 extending downward from a flange 337 of the frame B. The spring 333 is normally under tension and by reason of the connections just noted, causes the cam roller 325 to engage its cam face 334 during the rotation of the cam shaft R.

The roller 326 is maintained in contact with the same cam surface 324 by a practically duplicate arrangement. The lever 327 is provided with an arm 340 which moves in a plane parallel to the plane of movement of the arm 322. The outer end of the arm 340 is provided with a coiled tension spring 341 which extends downward alongside of the spring 333 and is secured at its lower end to the projection 334ᵃ on a supporting rod 335ᵃ.

In connection with the latter lever, that is to say, the lever 327, provision is made for holding the associated roller 326 out of operative engagement with the cam surface 324 whenever it is desired to stop the capper operation. For this purpose, the lever 327 is provided with a pin 342 which is adapted to engage a shoulder 343 upon a pivoted latch arm 344. The latter is pivoted to one side of the capper frame 328 and normally the shoulder 343 lies below the path of travel of the pin 342 and does not interfere with the operation of the mechanism. However, when it is desired to stop the feeding of caps, the latch arm 344 is drawn upward and the shoulder 343 slipped in behind the pin 342 at the time when the cam roller 326 is at its outermost position. While the latch arm 344 maintains this inoperative relation, the reciprocating member 167 is quiescent, consequently no caps are fed forward.

In the present instance, no provision is made for holding the cam roller 325 out of engagement with its cam face 324, and consequently the plunger 168 continues to move up and down, but, inasmuch as no caps are presented when the latch 344 is operating to hold the feeder bar 167 out of operation, no caps are forced into containers. In other words, so long as the caps are not fed forward to the plunger position, there is no need of stopping the plunger action, since in any event, no caps can be applied.

In order to properly position the rotary table 118 of the mechanism E relative to the feeder position a, the filling position b, the capping position c and the discharge position d, we provide means for adjusting the position of the actuating drum cam 125 upon the cam shaft R. The cam 125 is splined or otherwise mounted upon the shaft R so as to rotate with it but at the same time be free for a certain amount of longitudinal movement along the shaft. A key or feather 347, which will be properly secured to the shaft R and movable in a key-way in the bore of the cam 125, will provide for such relative movement of the parts. Since the cam surface 126 of the cam 125 cooperates with the cam rollers 124 positioned on the under side of the table 118, it is possible by shifting the cam 125 along the shaft R, to accurately adjust the table circumferentially with reference to the various positions a, b, c and d previously mentioned. To bring about this indexing adjustment we preferably provide an adjusting screw 348 which passes freely through a bore in the cam member 151, which is fixed to the shaft R, and into threaded engagement with a threaded bore in the adjacent portion of the cam 125. A head 349 at the end of the threaded pin provides for the rotation of the pin by a wrench so as to screw it into or out of the threaded opening in the cam 125. When the proper setting is obtained then the parts are held in position by a lock nut 350. Obviously other ways of arranging this threaded adjusting pin 348 and its associated parts might be employed and the same adjustability obtained. It will be noted that it is because of the quite accurate fit of the cam rollers 124 within the slot 126 of the cam 125 that it is possible to quite accurately adjust the position of the table 118 by shifting the position of the cam 125 longitudinally of the cam shaft R.

Obviously, in building the machine various parts may be protected by coverings or casings such as the casing 353, shown in Fig. 1, which incloses some of the reciprocating parts at the front of the machine, the same serving also as guards for the protection of the user of the machine. It will also be obvious that the circuit of the electric motor M may be controlled by a suitable switch located at a convenient point. As illustrated in Fig. 1, such a switch, designated 354, is located on the front of the machine just above the chute H and adjacent to the capper G and the electrical connections from it to the motor extend through a conduit 355 shown passing downward and inward to the motor M located within the base A. For the purpose of obtaining access to the motor M and its associated parts within the base A, hand holes are provided at suitable points, such as shown in Fig. 1, where the same are shown closed by covers 356 and 357, having handles 358 and 359, respectively.

In carrying out the present invention, it will be apparent that many changes and alterations may be made in the details of the structures and mechanisms shown without departing from the spirit and scope of the invention. We, therefore, do not wish to be limited to the exact details disclosed but aim to cover by the terms of the appended claims all the alterations and modifications which rightly come within the scope of the invention.

We claim:

1. In a machine of the class described, a commodity delivering nozzle, a horizontal rotary conveying table having a series of pockets for holding containers with their open ends upward and bringing them successively to filling position beneath said nozzle, projecting cam rollers on the under side of said table spaced peripherally at regular intervals, a cam shaft journaled adjacent to the under side of said table, a drum cam having a groove for operatively engaging said cam rollers, said groove and cam rollers being operative to advance said table step by step with an intervening rest period following each advance step, means for adjusting said drum cam longitudinally of said cam shaft whereby the position of said table may be adjusted circumferentially relative to said nozzle to bring said container pockets successively in line with said nozzle for filling, and means for supplying charges of the commodity through said nozzle to the containers as they present themselves beneath said nozzle.

2. In a machine of the class described, a commodity delivering nozzle, a horizontal rotary conveying table having a series of holes for holding containers with their open ends upward and bringing them successively to filling position beneath said nozzle, projecting cam rollers on the under side of said table spaced peripherally at regular intervals, a cam shaft journaled adjacent to the under side of said table, a drum cam having a groove for operatively engaging said cam rollers, said groove and cam rollers being operative to advance said table step by step with an intervening rest period following each advance step, means for supplying charges of the commodity through said nozzle to the containers as they successively present themselves for filling, a member for engaging the bottom of a container in the filling position beneath said nozzle and elevating the same into contact with said nozzle, an elevating cam on said cam shaft, means actuated by said elevating cam to move said engaging member up and down in timed relation to the operation of said supplying means, a rod having threaded engagement with said drum cam and rotary engagement with said elevating cam whereby said drum cam may be adjusted along said cam shaft to accurately set said table holes relative to said nozzle.

3. In a machine of the class described, a commodity supplying nozzle, a horizontal rotary conveying table having a series of container holding openings, means for rotating said table step by step with a rest period following each step, means for supplying charges of the commodity to containers placed in said openings and advanced successively to filling position beneath said nozzle, said rest periods allowing also for the closing of filled containers while in said openings, a vertically movable ejector member movable up and down through each of said openings as it presents itself at a delivery point, said member having at its upper end a head adapted to engage the bottom of the container a little off center, and a loop extending from said head through and beyond the center point of the container bottom, also operative to engage the bottom of the container, the head however normally engaging the container slightly in advance of the loop, said ejector member operating to expel from the table filled and closed containers, and means for actuating said ejector member during the rest periods in the travel movements of said table.

4. In a machine of the class described, a commodity delivering nozzle, a horizontal rotary conveying table having a series of holes for holding containers with their open ends upward and bringing them successively to filling position beneath said nozzle, projecting cam rollers on the under side of said table spaced peripherally at regular intervals, a cam shaft journaled adjacent to the under side of said table, a drum cam having a groove for operatively engaging said cam rollers, said groove and cam rollers being operative to advance said table step by step with an intervening rest period following each advance step, the position of said table relative to said cam and nozzle being such that during each rest period one of the holes in said table lies directly beneath said nozzle, and one of said openings is at an exact delivery point, means for supplying charges of the commodity through said nozzle to the containers as they are presented to the nozzle, a vertically movable ejector member movable up and down through each of said table openings as each particular opening presents itself at said delivery point, an ejector operating cam on said cam shaft, a sliding bar alongside of said cam shaft, a cam roller and connections for reciprocating said bar in response to the rotation of said cam shaft, and connections between said sliding bar and said vertically movable ejector member for actuating the latter in response to the former to discharge filled containers from said rotary table.

HARLEY R. PHILLIPS.
HENRY J. CLARKE.